(12) United States Patent
Winterowd et al.

(10) Patent No.: US 12,257,814 B2
(45) Date of Patent: Mar. 25, 2025

(54) HEAT TRANSFER SYSTEM WITH IMPROVED EFFICIENCY FOR COMPOSITE PANEL PRODUCTION

(71) Applicant: Continuus Materials Intellectual Property, LLC, The Woodlands, TX (US)

(72) Inventors: Jack G. Winterowd, The Woodlands, TX (US); Matt Spencer, The Woodlands, TX (US); Marko Suput, The Woodlands, TX (US); Kasey Fisher, The Woodlands, TX (US)

(73) Assignee: Continuus Materials Intellectual Property, LLC, The Woodlands, TX (US)

( * ) Notice: Subject to any disclaimer, the term of this patent is extended or adjusted under 35 U.S.C. 154(b) by 453 days.

(21) Appl. No.: 17/855,610

(22) Filed: Jun. 30, 2022

(65) Prior Publication Data
US 2024/0001663 A1   Jan. 4, 2024

(51) Int. Cl.
*B32B 37/06* (2006.01)
*B32B 5/16* (2006.01)
(Continued)

(52) U.S. Cl.
CPC ............... *B32B 37/06* (2013.01); *B32B 5/16* (2013.01); *B32B 7/12* (2013.01); *B32B 37/08* (2013.01);
(Continued)

(58) Field of Classification Search
CPC ....... B29C 2035/0211; B29C 2035/043; B29C 2035/1616; B29C 2043/483;
(Continued)

(56) References Cited

U.S. PATENT DOCUMENTS 10,479,134 B2   11/2019   Hannig

FOREIGN PATENT DOCUMENTS

EP   3 551 413 A1   10/2019
EP   3 838 589 A1   6/2021
(Continued)

OTHER PUBLICATIONS

Search Report for EP4299273.*

*Primary Examiner* — Sonya M Sengupta
(74) *Attorney, Agent, or Firm* — FOLEY & LARDNER LLP (57) ABSTRACT

A method may include forming a mat including paper fragments, plastic fragments, and top and bottom outer surface layers, wherein the outer surface layers have maximum processing temperature values and consolidating the formed mat in a continuous hot press including three pairs of opposing top and bottom heating platens. A first pair of heating platens has a first heating power. A second pair of heating platens has a second, lower heating power. A third pair of heating platens has a third, even lower heating power. The method may include consolidating the formed mat in a continuous cold press including three pairs of opposing top and bottom heating platens. A first pair of cooling platens has a first cooling power. A second pair of cooling platens has a second, lower cooling power. A third pair of cooling platens and has a third, even lower cooling power.

9 Claims, 5 Drawing Sheets

(51) Int. Cl.
  *B32B 7/12*      (2006.01)
  *B32B 37/08*     (2006.01)
  *B32B 37/10*     (2006.01)
  *B32B 37/12*     (2006.01)
(52) U.S. Cl.
  CPC .......... *B32B 37/1027* (2013.01); *B32B 37/12* (2013.01); *B32B 2264/02* (2013.01); *B32B 2264/04* (2013.01)
(58) Field of Classification Search
  CPC ....... B29C 35/041; B29C 35/16; B29C 43/30; B29C 43/48; B29C 43/52; B29K 2105/26; B29K 2201/00; B29K 2311/14; B29L 2009/00; B32B 37/06; B32B 37/08; B32B 37/1027; B32B 37/12; B32B 5/16; B32B 7/12; B32B 2264/02; B32B 2264/04
  See application file for complete search history.

(56) References Cited

FOREIGN PATENT DOCUMENTS

| | | |
|---|---|---|
| EP | 3 957 455 A1 | 2/2022 |
| KR | 20190013294 A | 2/2019 |

\* cited by examiner

HEAT TRANSFER SYSTEM WITH IMPROVED EFFICIENCY FOR COMPOSITE PANEL PRODUCTION

BACKGROUND

The manufacture of some materials, such as composite boards, involves consolidating mats of materials in a press. Presses used for this purpose may be heated to high temperatures to facilitate the rapid consolidation of the mats of materials. Large amounts of power are needed to heat the presses used to consolidate the mats of materials.

SUMMARY

Aspects of the present disclosure relate to a method including forming a mat including paper fragments and plastic fragments that are positioned between opposing outer surface layers, wherein the outer surface layers can have a maximum processing temperature in order to avoid being thermally damaged (melted, shrank, charred, or otherwise thermally degraded), wherein the formed mat is consolidated in a continuous hot press, wherein the continuous hot press includes a first pair of heating platens (top and bottom) and a second pair of heating platens (top and bottom), wherein the continuous press further comprises a pair of steel belts (top and bottom), wherein the first pair of heating platens and the second pair of heating platens are disposed such that the formed mat is processed through the first pair of heating platens before being processed through the second pair of heating platens, wherein a heating power of the first pair of heating platens is greater than a heating power of the second pair of heating platens, and consolidating the formed mat in a continuous cold press, wherein the cold press includes a first pair of cooling platens and a second pair of cooling platens, wherein the first pair of cooling platens and the second pair of cooling platens are disposed such that the formed mat is processed through the first pair of cooling platens before being processed through the second pair of cooling platens, and wherein a cooling power of the first pair of cooling platens is greater than a cooling power of the second pair of cooling platens.

The method may include forming the mat to include a top surface layer attached to the mat by adhesive, and a bottom surface layer attached to the mat by adhesive, wherein the top and bottom surface layers have maximum processing temperatures in some embodiments.

The method may include maintaining the heating power of the first heating platen and the heating power of the second heating platen constant with respect to time.

The method may include wherein the heating power of the first pair of heating platens and the heating power of the second pair of heating platens are each held constant with respect to time using a high flow rate of heated oil through heating channels within each of the first heating platens and each of the second heating platens.

The method may include wherein the heating power of the first heating platens and the heating power of the second heating platens are held constant with respect to time using platens with a high internal channel volume wherein the channels are within each of the heated platens and are used for passage of heated oil for each of the first heating platens and each of the second heating platens.

The method may include maintaining a temperature of the first heating platens equal to a temperature of the second heating platens.

The method may include maintaining a temperature of the first heating platens equal to a temperature of the second heating platens, wherein the temperature of the first heating platens and the second heating platens is less than the maximum processing temperature of the outer surface layers.

The method may include maintaining the cooling power of the first cooling platens and the cooling power of the second cooling platens constant with respect to time.

The method may include wherein the cooling power of the first cooling platens and the cooling power of the second cooling platens are held constant with respect to time using a high flow rate of chiller fluid through cooling channels of each of the first cooling platens and the second cooling platens.

The method may include wherein the cooling power of the first cooling platens and the cooling power of the second cooling platens are held constant with respect to time using platens with a high internal channel volume, wherein the channels are within the cooling platens and are used for the passage of chiller fluid for each of the first cooling platens and each of the second cooling platens.

The method may include maintaining a temperature of each of the first cooling platens equal to a temperature of each of the second cooling platens.

Aspects of the present disclosure relate to a system including a continuous press including a first pair of heating platens (top and bottom), a second pair of heating platens (top and bottom), and a pair of steel belts (top and bottom) that are in direct contact with the hot platens, disposed such that a mat consolidated by the continuous hot press is processed between the first pair of heating platens before being processed between the second pair of heating platens, wherein a first heating platen heating power is greater than a second heating platen heating power, a first pair of cooling platens, and a second pair of cooling platens disposed such that a mat consolidated by the continuous cold press is processed between the first pair of cooling platen before being processed between the second pair of cooling platens, wherein a first pair of cooling platens cooling power is greater than a second pair of cooling platens cooling power.

The system may include wherein the first heating platen pair heating power, the second heating platen pair heating power, the first cooling platen pair cooling power, and the second cooling platen pair cooling power are tuned to consolidate a mat comprising paper fragments, plastic fragments and one or more outer surface layers with maximum processing temperature values.

The system may include wherein the first heating platen pair is configured to maintain its heating power constant with respect to time and the second heating platen pair is configured to maintain its heating power constant with respect to time.

The system may include wherein the first heating platen pair and the second heating platen pair further comprise interior channels within each of the platens that are configured to allow the flow of a heated oil at a sufficiently high rate, such that, in combination with a heating oil temperature and a belt and mat temperature, a targeted heating power of the first heating platen pair and the heating power of the second heating platen pair each remain constant with respect to processing time.

The system may include wherein the first heating platen pair and the second heating platen pair further comprise heating channels configured to allow a sufficiently high volume of heated oil within each platen, such that, in combination with the heating oil flow rate, the heating oil temperature, and a belt and mat temperature, a targeted heating power of the first heating platen pair and the heating power of the second heating platen pair each remain constant with respect to processing time.

The system may include wherein the first heating platen pair and the second heating platen pair are configured to maintain a constant temperature with respect to time.

The system may include wherein the first cooling platen pair is configured to maintain its cooling power constant with respect to time and the second cooling platen pair is configured to maintain its cooling power constant with respect to time.

The system may include wherein the first cooling platen pair and the second cooling platen pair further comprise interior channels within each of the platens that are configured to allow the flow of a chiller fluid at a sufficiently high rate such that, in combination with a chiller fluid temperature and a belt and mat temperature, a targeted cooling power of the first cooling platen pair and the cooling power of the second cooling platen pair each remain constant with respect to processing time.

The system may include wherein the first cooling platen pair and the second cooling platen pair further comprise cooling channels configured to allow a sufficiently high volume of chiller fluid within each platen, such that, in combination with the chiller fluid flow rate, the chiller fluid temperature, and a belt and mat temperature, a targeted cooling power of the first cooling platen pair and the cooling power of the second cooling platen pair each remain constant with respect to processing time.

The system may include wherein the first cooling platen pair and the second cooling platen pair are configured to maintain a constant temperature with respect to processing time.

Aspects of the present disclosure are related to a method including forming a mat comprising paper fragments, plastic fragments, a bottom outer surface layer, and a top outer surface layer, wherein the outer surface layers have a maximum processing temperature, consolidating the formed mat in a continuous hot press, wherein the continuous hot press comprises a first pair of opposing top and bottom heating platens, a second pair of opposing top and bottom heating platens, and a third pair of opposing top and bottom heating platens, wherein the first heating platen pair, the second heating platen pair, and the third heating platen pair are disposed such that the formed mat is processed between the first heating platen pair and then the second heating platen pair and then the third heating platen pair, wherein a heating power of the first platen pair is greater than a heating power of the second platen pair and the heating power of the second platen pair is greater than a heating power of the third platen pair, and consolidating the formed mat in a continuous cold press, wherein the cold press comprises a first pair of opposing top and bottom cooling platens, a second pair of opposing top and bottom cooling platens, and a third pair of opposing top and bottom cooling platens, wherein the first cooling platen pair, the second cooling platen pair, and the third cooling platen pair are disposed such that the formed mat is processed between the first cooling platen pair, and then the second cooling platen pair, and then the third cooling platen pair, and wherein a cooling power of the first cooling platen pair is greater than a cooling power of the second cooling platen pair and the cooling power of the second cooling platen pair is greater than a cooling power of the third cooling platen pair.

The method may include wherein the heating power of the first heating platen pair, the heating power of the second heating platen pair, and the heating power of the third platen pair are held constant with respect to time using a high flow rate of heated oil through heating channels of the first heating platen pair and the second heating platen pair; wherein the temperature of the first heating platen pair at the interface of the platen and the steel belt is less than 10° F. different than the temperature of the second heating platen pair at the interface of the platen and the steel belt; wherein the temperature of the first heating platen pair at the interface of the platen and the steel belt is less than 10° F. different than the temperature of the third heating platen pair at the interface of the platen and the steel belt; wherein the temperature of the first heating platen pair at the interface of the platen and the steel belt is less than 20° F. different than the maximum processing temperature of the outer surface layers of the composite.

The method may include wherein the heating power of the first heating platen pair, the heating power of the second heating platen pair, and the heating power of the third platen pair are held constant with respect to time using a high flow rate of heated oil through heating channels of the first heating platen pair and the second heating platen pair; wherein the temperature of the first heating platen pair at the interface of the platen and the steel belt is less than 10° F. different than the temperature of the second heating platen pair at the interface of the platen and the steel belt; wherein the temperature of the first heating platen pair at the interface of the platen and the steel belt is less than 10° F. different than the temperature of the third heating platen pair at the interface of the platen and the steel belt; wherein the temperature of the first heating platen pair at the interface of the platen and the steel belt is in the range of about 300-420° F.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The current disclosure solves the technical problem of reducing the required energy expenditure for consolidating mats of materials while simultaneously maximizing production rate using a hot platen temperature that is sufficiently cool such that outer surface layers of the mat are not melted or otherwise thermally damaged. Mats composed of plastic fragments and paper fragments require heat in order to be consolidated. Partial or complete melting of plastic fragments, without disrupting the shape or spatial of components, is used to consolidate the mat. Heat may be provided using a hot press. In order to ensure that outer surface layers in the mat are not thermally damaged (melted, shrank, charred, or otherwise thermally degraded), there is often a maximum platen temperature that can be used in the hot continuous press. In order to maximize the rate of heat transfer into the mat, for the sake of maximum production rate, it is desirable to set the platen temperature to the maximum allowable temperature for all platens along the length of the hot press. In contrast to using an essentially constant temperature value of the hot platen pairs along the length of the hot-press, the heating power values of the individual platen pairs do not need to be the same. There is a critical heating power for each segment of the continuous hot press that simultaneously achieves a maximum heat transfer rate without wasting energy. This critical heating power can be expressed in a general manner that reflects certain steel belt characteristics and certain mat characteristics. The critical heating power diminishes from the infeed end of the continuous hot press to the outfeed end of the press. As the mat exits the hot press, it must be processed in a cold press within a period of less than about 3 minutes. To retain the targeted thickness of the final panel, the mat is cooled in the cold press while maintaining pressure on the mat. Cooling may be provided by a cold press. Although a constant heating power throughout the length of the hot press could be used and a constant cooling power throughout the length of the cold press could be used, the resulting manufacturing system would waste energy. By using a gradient of heating power values, the core of the mat (at the mid-point between the top and bottom major surfaces) reaches required threshold temperature values for bond-formation with maximum speed and minimum energy usage. Excess heat is not introduced into the mat, and waste of power is avoided. Additionally, use of the gradient of heating power values allows for faster cold-press time values. Specifically, by avoiding excess heat absorption into the mat during hot-pressing, less heat needs to be removed from the mat during cold-pressing. Thus, the mat can be cooled to a target temperature faster when a gradient of heating powers are used in the hot-press.

Figure 1:
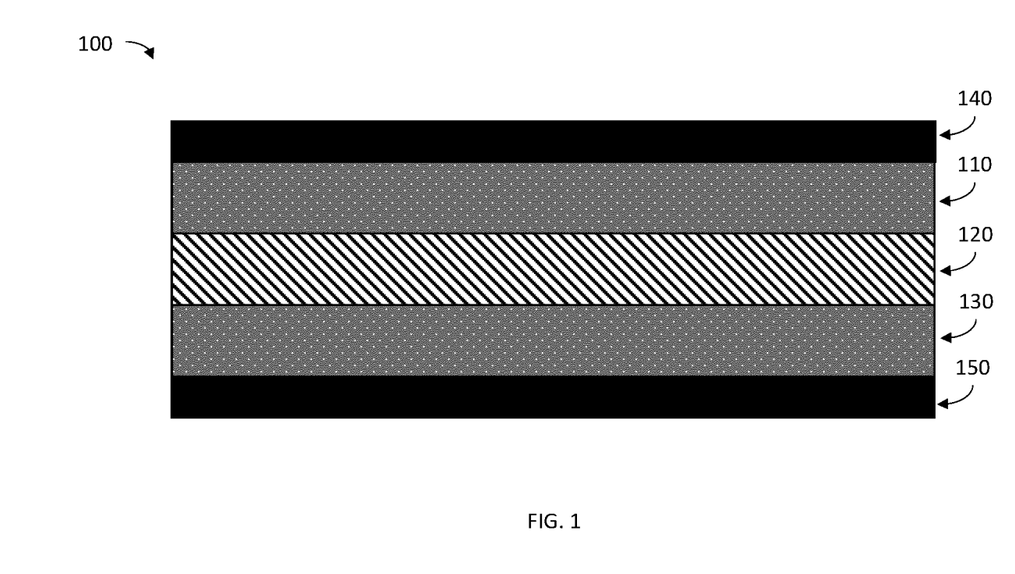
FIG. 1 is an example mat comprising paper fragments, plastic fragments, and outer surface layers in accordance with one or more embodiments.

FIG. 1 is an example mat 100 comprising paper fragments and plastic fragments, in accordance with one or more embodiments. The mat 100 may include a core layer 120 comprising paper fragments and plastic fragments. In some embodiments, the mat 100 may include a top layer 110 and/or a bottom layer 130. The top layer 110 and the bottom layer 130 may have identical compositions of paper fragments and plastic fragments. The top layer 110 and the bottom layer 130 may have paper fragments and plastic fragments of the same sizes or different sizes than the paper fragments and plastic fragments of the core layer 120. The top layer 110 and the bottom layer 130 may have the same paper/plastic ratio or a different paper/plastic ratio than the core layer 120. In other embodiments, the mat may include a top surface layer 140 and/or a bottom surface layer 150. The top surface layer 140 and the bottom surface layer 150 may be plastic. The example mat 100 may be consolidated using heat and pressure, as discussed herein.

During consolidation, the mat 100 may absorb heat and components of the mat may undergo phase changes, such as the melting of plastic fragments.

Figure 2:
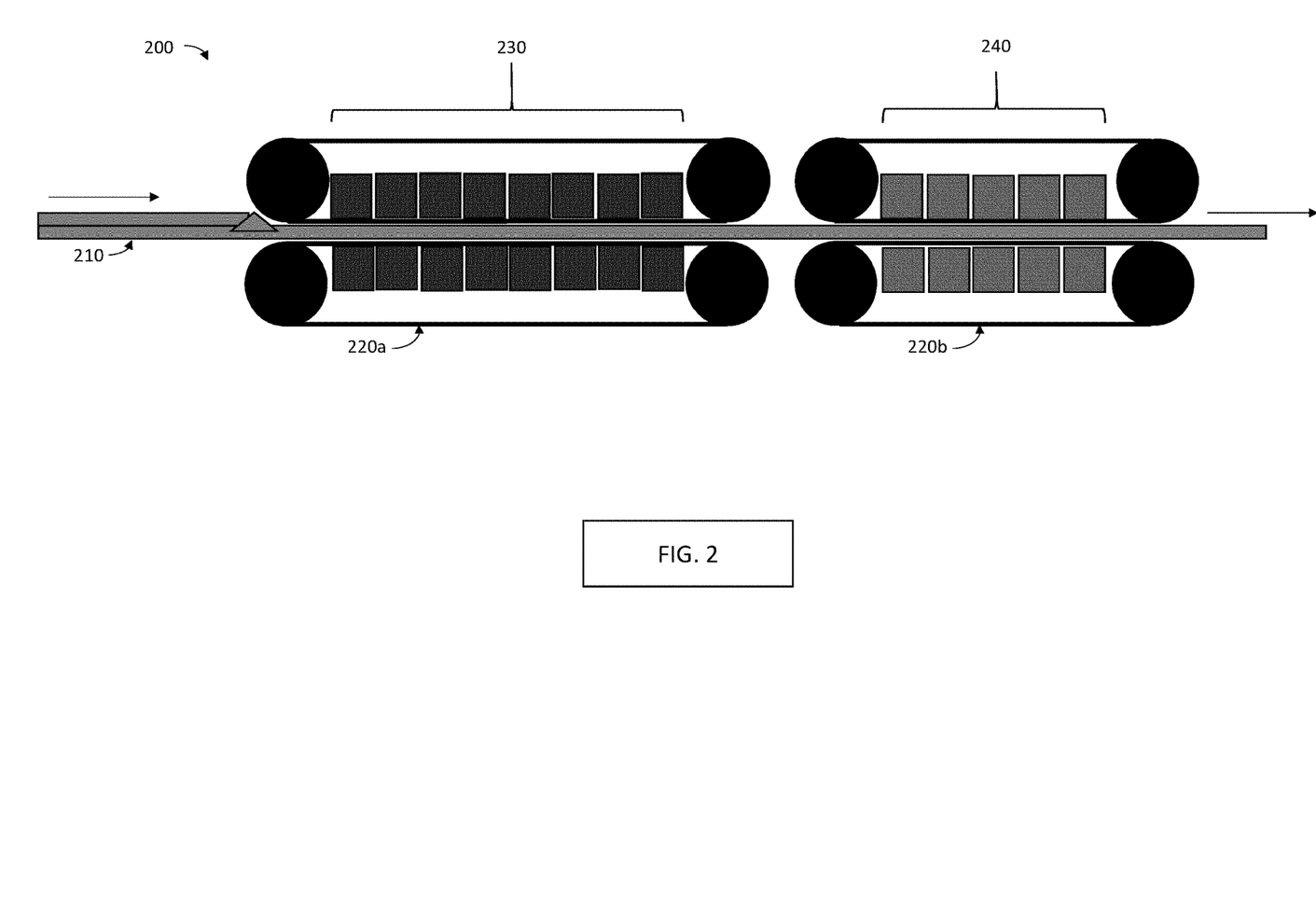
FIG. 2 illustrates an example press system, in accordance with one or more embodiments.

FIG. 2 illustrates an example press system 200, in accordance with one or more embodiments. The press system 200 may be used to consolidate a mat 210. The mat 210 may be the mat 100 of FIG. 1. The press system 200 may be a continuous press system which applies heating and cooling to the mat 210 using the hot press 230 and the cold press 240 as the mat 210 is moved through the press system 200 by the belt 220a and the belt 220b. The mat 210 may be a continuous ribbon. The press system 200 may include the hot press 230 and the cold press 240. The hot press 230 may include two or more heating platen pairs. The hot press 230 may include the belt 220a. The cold press 240 may include two or more cooling platen pairs. The cold press 240 may include the belt 220b. The heating platens may transfer heat through the belt 220a to the mat 210. The cooling platens of the cold press 240 may absorb heat from the mat 210 wherein the heat is conducted through the belt 220b. The belts 220a and 220b may move the mat 210 through the press system 200.

In some embodiments, the belt 220a of the hot press 230 may include a top belt and a bottom belt of the belt 220a on opposite sides of the mat. The top belt and the bottom belt of the belt 220a may each include opposing heating platen pairs which transfer heat to the mat 210. The top belt and the bottom belt of the belt 220a may absorb heat from the heating platens along the length of the hot press 230 when they are in contact with the heating platens. The top belt and the bottom belt of the belt 220a may lose heat along the length of the hot press 230 when they are not in contact with the heating platens. For example, the top belt and the bottom belt of the belt 220a may have a temperature of about 300-420° F. when in contact with the heating platens, but when the belt exits the back end of the press and is returned to the front end of the press in an external region of the press that is away from the hot platens, then the belt can experience radiant heat loss and the temperature of the belt can be lower. Thus, the belt 220a might have a temperature of about 150-270° F. at the point at which the top belt and the bottom belt first come into contact with the heating platens at the beginning of the hot press 230. In some embodiments, the top belt and the bottom belt of the belt 220a may be in contact with a back portion of the heating platens in the external region of the press such that a difference in temperature between the belt 220a when in contact with the mat 210 and the belt 220a when first coming into contact with the mat 210 at the beginning of the hot press 230 is less than 150° F.

In some embodiments, heating power values of the top and bottom heating platen pairs of the hot press 230 may follow a gradient with respect to the length of the hot-press. The heating power values of the heating platen pairs may decrease from the beginning of the hot press 230 to an end of the hot press 230. For example, a preferred heating power for a first 10% of the hot press 230 may be about 150-300 $W/ft^2$ per each ft/min of line speed. The line speed may be a linear speed at which the mat 210 passes through the hot press 230. The first 10% of the hot press 230 may have an additional heating power equal to about 2.1 $W/ft^2$ per each ft/min of line speed and the temperature difference in Fahrenheit between a first hot platen surface temperature and an incoming belt temperature for a press segment length of about 2.5 meters. The additional heating power may be needed to raise a temperature of the belt 220a to a desired temperature. The additional heating power for the steel belt could be greater for belts thicker than about 2.7 mm and could be lesser for belts thinner than about 2.7 mm. A second 10% of the hot press 230 may have a heating power of about 70-125 W/ft$^2$ per each ft/min of line speed. A third 10% and a fourth 10% of the hot press 230 may have a heating power of about 40-90 W/ft$^2$ per each ft/min of line speed. A fifth 10%, a sixth 10% and a seventh 10% of the hot press 230 may have a heating power of about 30-70 W/ft$^2$ per each ft/min of line speed. An eighth 10%, a ninth 10% and a tenth 10% of the hot press 230 may have a heating power of about 20-50 W/ft$^2$ per each ft/min of line speed. The heating power values of the hot press 230 may represent a combined heating power of the heating platens on the top and bottom sides of the mat 210. Heating power values may vary based on composition, thickness and density of the mat 210. Use of the gradient of heating powers may cause the mat 210 to reach threshold temperatures that are needed for bond formation within the mat 210 while requiring less expenditure of power than if the gradient of heating powers were not used. Furthermore, the preferred gradient of heating power values in the continuous hot press can yield a maximum rate of heat transfer into the mat while simultaneously supporting a condition in which heat can be removed from the mat at a maximum rate during cold pressing.

The heating platens of the hot press may all have approximately the same temperature. This temperature could be the maximum processing temperature associated with the outer layers of the mat. For example, if the outer surface layers are thermally damaged at a temperature of about 410° F., then the temperature of the platens might be set to about 400° F. at the interface where the hot platen contacts the steel belt. The gradient of heating power values may be used in conjunction with a constant temperature along the length of the hot press 230. The constant temperature may be low enough to avoid damaging components of the mat 210, such as the top and bottom outer surface layers, which might have maximum processing temperature values.

In some embodiments, the belt 220b of the cold press 240 may include a top belt and a bottom belt of the belt 220b on opposite sides of the mat. The top belt and the bottom belt of the belt 220b can be in direct contact with the top and bottom cooling platens, which absorb heat that has been transferred from the mat 210 into the steel belts. The top belt and the bottom belt of the belt 220b may desorb heat into the cooling platens along the length of the cold press 240 when they are in contact with the cooling platens. The top belt and the bottom belt of the belt 220b may gain heat along the length of the cold press 240 when they are not in contact with the cooling platens. For example, the top belt and the bottom belt of the belt 220b may have a temperature of about 35-110° F. when in contact with the cooling platens, and a temperature of about 150° F. more at the point at which the top belt and the bottom belt first come into contact with the cooling platens at the beginning of the cold press 240. In some embodiments, the top belt and the bottom belt of the belt 220b may be in contact with a back portion of the cooling platens such that a difference in temperature between the belt 220b when in contact with the mat 210 and the belt 220b when first coming into contact with the mat 210 at the beginning of the cold press 240 is less than 150° F.

In some embodiments, cooling power values of the cooling platen pairs of the cold press 240 may follow a gradient. The cooling power values of the cooling platens may decrease from the beginning of the cold press 240 to an end of the cold press 240. For example, a preferred cooling power for a first 10% of the cold press 240 may be about 125-200 W/ft$^2$ per each ft/min of line speed. The line speed may be the linear speed at which the mat 210 passes through the cold press 240. The first 10% of the cold press 240 may have an additional cooling power equal to about 2.1 W/ft$^2$ per each ft/min of line speed and the temperature difference in Fahrenheit between a cold platen surface temperature and an incoming belt temperature for a press segment length of about 2.5 meters. The additional cooling power may be needed to lower a temperature of the belt 220b to a desired temperature. The additional cooling power for the steel belt could be greater for belts thicker than about 2.7 mm and could be lesser for belts thinner than about 2.7 mm. A second 10% of the cold press 240 may have a cooling power of about 40-100 W/ft$^2$ per each ft/min of line speed. A third 10% and a fourth 10% of the cold press 240 may have a cooling power of about 25-W/ft$^2$ per each ft/min of line speed. A fifth 10%, a sixth 10% and a seventh 10% of the cold press 240 may have a cooling power of about 15-50 W/ft$^2$ per each ft/min of line speed. An eighth 10%, a ninth 10% and a tenth 10% of the cold press 240 may have a cooling power of about 10-W/ft$^2$ per each ft/min of line speed. The cooling power values of the cold press 240 may represent a combined cooling power of cooling platens on both sides of the mat 210. Cooling power values may vary based on composition of the mat 210. Use of the gradient of cooling powers may cause the mat 210 to reach threshold temperatures that are required for bond formation within the mat 210 while simultaneously minimizing expenditure of power used to cool the mat compared to that which would be used if the gradient of cooling power values were not used.

The cooling platens of the cold press may all have approximately the same temperature. The gradient of cooling power values may be used in conjunction with a constant temperature along the length of the cold press 240.

In some embodiments, the mat 210 includes wood.

Figure 3:
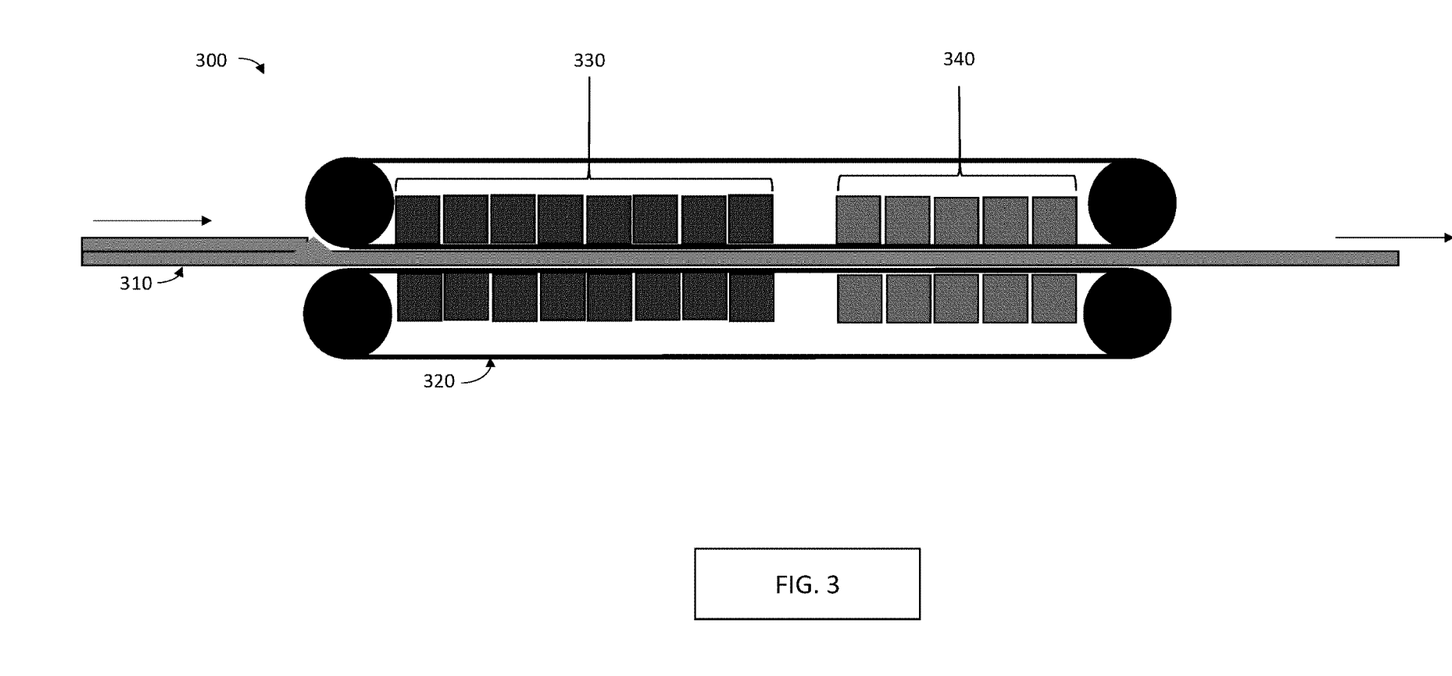
FIG. 3 illustrates another example press system, in accordance with one or more embodiments.

FIG. 3 illustrates another example press system 300, in accordance with one or more embodiments. The press system 300 may be used to consolidate a mat 310. The mat 310 may be the mat 100 of FIG. 1. The press system 300 may include a belt 320. The belt 320 may move the mat 310 through the press system 300. The press system 300 may be a continuous press which applies heating and cooling to the mat 310 as it is moved through the press system 330 by the belt 320. The mat 310 may be a continuous ribbon. The press system 300 may include a heating zone 330 and a cooling zone 340. The heating zone 330 may include two or more heating platen pairs. The cooling zone 340 may include two or more cooling platen pairs. The heating platens may transfer heat through the belt 320 to the mat 310. The cooling platens may absorb heat from the mat 310 through the belt 320. The press system 300 may or may not include a gap between the heating zone 330 and the cooling zone 340.

In some embodiments, the belt 320 may include a top belt and a bottom belt of the belt 320 on opposite sides of the mat. The top belt and the bottom belt of the belt 320 may each include opposing heating platens in the heating zone 330 and opposing cooling platens in the cooling zone 340. The top belt and the bottom belt of the belt 320 may absorb heat from the heating platens along the length of the heating zone 330 when they are in contact with the heating platens. The top belt and the bottom belt of the belt 320 may radiate heat along the length of the heating zone 330 when they are not in contact with the heating platens. For example, the top belt and the bottom belt of the belt 320 may have a temperature of about 300-420° F. when in contact with the heating platens, and a temperature of about 70-110° F. at the point at which the top belt and the bottom belt first come into contact with the heating platens at the beginning of the heating zone 330. In some embodiments, the top belt and the bottom belt of the belt 320 may be in contact with a back portion of the heating platens in order to reduce a difference in temperature between the belt 320 when in contact with the mat 310 and the belt 320 when first coming into contact with the mat 310 at the beginning of the heating zone 330.

In some embodiments, heating power values of the heating platen pairs of the heating zone 330 may follow a gradient. The heating power values of the heating platen pairs may decrease from the beginning of the heating zone 330 to an end of the heating zone 330. For example, a preferred heating power for a first 10% of the heating zone 330 may be about 150-300 W/ft$^2$ per each ft/min of line speed. The line speed may be a linear speed at which the mat 310 passes through the heating zone 330. The first 10% of the heating zone 330 may have an additional heating power equal to about 2.1 W/ft$^2$ per each ft/min of line speed and the temperature difference in Fahrenheit between a hot platen surface temperature and an incoming belt temperature for a press segment length of about 2.5 meters. The additional heating power may be needed to raise a temperature of the belt 320 to a desired temperature. The additional heating power for the steel belt could be greater for belts thicker than about 2.7 mm and could be lesser for belts thinner than about 2.7 mm. A second 10% of the heating zone 330 may have a heating power of about 70-125 W/ft$^2$ per each ft/min of line speed. A third 10% and a fourth 10% of the heating zone 330 may have a heating power of about 40-90 W/ft$^2$ per each ft/min of line speed. A fifth 10%, a sixth 10% and a seventh 10% of the heating zone 330 may have a heating power of about 30-70 W/ft$^2$ per each ft/min of line speed. An eighth 10%, a ninth 10% and a tenth 10% of the heating zone 330 may have a heating power of about 20-50 W/ft$^2$ per each ft/min of line speed. The heating power values of the heating zone 330 may represent a combined heating power of top and bottom heating platen pairs on both sides of the mat 310. Heating power values may vary based on composition of the mat 210. Use of the gradient of heating powers may cause the mat 310 to reach threshold temperatures for bond formation within the mat 310 while requiring less expenditure of power than if the gradient of heating powers were not used. Furthermore, the preferred gradient of heating power values in the continuous hot press can yield a maximum rate of heat transfer into the mat while simultaneously supporting a condition in which heat can be removed from the mat at a maximum rate during cold pressing.

The heating platens of the hot press may all have approximately the same temperature. This temperature could be the maximum processing temperature associated with the outer layers of the mat. For example, if the outer surface layers are thermally damaged at a temperature of about 410° F., then the temperature of the platens might be set to about 400° F. at the interface where the hot platen contacts the steel belt. The gradient of heating power values may be used in conjunction with a constant temperature along the length of the heating zone 330. The constant temperature may be low enough to avoid damaging components of the mat 210, such as the outer surface layers.

The top belt and the bottom belt of the belt 320 may each contact cooling platens in the cooling zone 340 which absorb heat from the mat 310 through the steel belt 320. The top belt and the bottom belt of the belt 320 may desorb heat to the cooling platens along the length of the cooling zone 340 when they are in contact with the cooling platens. The top belt and the bottom belt of the belt 320 may gain heat along the length of the cooling zone 340 when they are not in contact with the cooling platens. For example, the top belt and the bottom belt of the belt 320 may have a temperature of about 35-110° F. when in contact with the cooling platens, and a temperature of about 320°-400° F. at the point at which the top belt and the bottom belt first come into contact with the cooling platens at the beginning of the cooling zone 340.

In some embodiments, the belt 320 may be heated by the heating zone 330 right up to the point at which it enters the cooling zone 340. In other embodiments, there may be a gap between the heating zone 330 and the cooling zone 340. Pressure may be maintained on the mat 310 in the gap by a neutral platen and/or the belt 320. In some embodiments pressure might not be exerted on the mat 310 between the heating zone 330 and the cooling zone 340.

In some embodiments, cooling power values of the cooling platen pairs of the cooling zone 340 may follow a gradient relative to the length of the press. The cooling power values of the cooling platens may decrease from the beginning of the cooling zone 340 to an end of the cooling zone 340. For example, a cooling power for a first 10% of the cooling zone 340 may be about 125-200 W/ft$^2$ per each ft/min of line speed. The line speed may be the linear speed at which the mat 310 passes through the cooling zone 340. The first 10% of the cooling zone 340 may have an additional cooling power equal to about 2.1 W/ft$^2$ per each ft/min of line speed and the temperature difference in Fahrenheit between a cold platen surface temperature and an incoming belt temperature for a press segment length of about 2.5 meters. The additional cooling power may be needed to lower a temperature of the belt 320 to a desired temperature. The additional cooling power for the steel belt could be greater for belts thicker than about 2.7 mm and could be lesser for belts thinner than about 2.7 mm. A second 10% of the cooling zone 340 may have a cooling power of about 40-100 W/ft$^2$ per each ft/min of line speed. A third 10% and a fourth 10% of the cooling zone 340 may have a cooling power of about 25-70 W/ft$^2$ per each ft/min of line speed. A fifth 10%, a sixth 10% and a seventh 10% of the cooling zone 340 may have a cooling power of about 15-50 W/ft$^2$ per each ft/min of line speed. An eighth 10%, a ninth 10% and a tenth 10% of the cooling zone 340 may have a cooling power of about 10-40 W/ft$^2$ per each ft/min of line speed. The cooling power values of the cooling zone 340 may represent a combined cooling power of cooling platens on both sides of the mat 310. Cooling power values may vary based on composition of the mat 210. Use of the gradient of cooling powers may cause the mat 210 to reach threshold temperatures for bond formation of the mat 210 while requiring less expenditure of power than if the gradient of cooling powers were not used.

The cooling platen pairs of the cold press may all have approximately the same temperature. The gradient of cooling power values may be used in conjunction with a constant temperature along the length of the cooling zone 340.

In some embodiments, the mat 310 includes wood.

Figure 4:
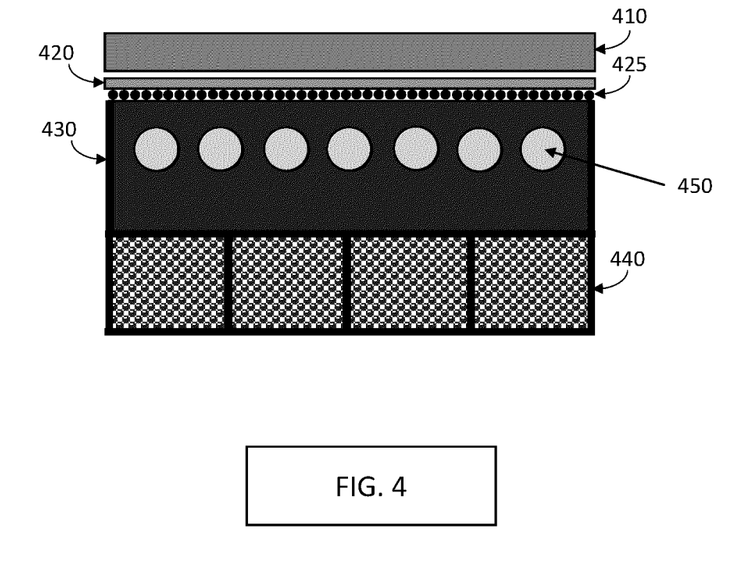
FIG. 4 illustrates an example platen, in accordance with one or more embodiments.

FIG. 4 illustrates an example platen 430, in accordance with one or more embodiments. The platen 430 may be a block of metal or other heat-conducting material. The platen 430 may include channels 450. The channels 450 may be configured to allow heating oil or chiller fluid to flow through them wherein the fluid either transfers heat to the platen 430 or removes heat from the platen 430. The platen 430 may be adjacent to insulation 440 which insulates the platen 430 from the surrounding environment. The platen 430 may transfer heat to or draw heat from a mat 410 through a belt 420 and rollers 425. The belt 420 may move the mat 410 through a press system, facilitated by the rollers 425. The platen 430 may be a platen of the press system 200 of FIG. 2 or a platen of the press system 300 of FIG. 3. Pressure cylinders (not pictured) may apply pressure to the platen 430 which is transferred to the steel belt 420 and mat 410.

In some embodiments, the platen 430 is a heating platen. Heating oil may flow through the channels 450. The platen 430 may transfer heat to the mat 410 through the belt 420 and rollers 425. The heating oil may flow through the channels 450 and transfer heat to the platen 430. The heating oil may be heated in a heating system before flowing through the channels 450. The heating oil may circulate through the heating system and the channels 450 in a circuit. In some embodiments, the channels 450 are a single channel which forms a circuit within the platen 430. In other embodiments, the channels 450 are distinct channels which each independently circulate through the platen 430 and the heating system. The channels 450 may be evenly distributed in the platen 430.

A heating power of the platen 430 may be increased by increasing a flow rate of the heating oil in the channels 450. In some cases, the distance between channels might be too large or the distance between channels and the surface of the platen that contacts the steel belt can be too large for the surface temperature of the belt to be the same as the temperature of the heating oil. Under these conditions, the rate of heating can be governed by the thermal conduction rate of the steel. When this occurs, the heating power of the platen 430 may be increased by increasing the internal volume of the channels 450. The flow rate of the heat transfer fluid and the internal volume of the channels may be tuned to provide a desired heating power of the platen 430. A temperature of the heating oil is measured prior to circulation in the platen 430 and after circulation in the platen to determine an amount of heat transferred from the oil to the platen 430. The flow rate of heating oil in the channels 450 may be adjusted based on the measured temperatures to adjust the heating power of the platen 430. Typically, the temperature of the heating oil as it enters the platen will be adjusted in a manner that achieves the targeted platen temperature at the surface of the platen that contacts the steel belt. For example, the temperature of the heating oil might be set to about 430° F. as it enters the platen in order to achieve a platen surface temperature of about 400° F. in a portion of the hot press. The heating power of the platen can also be increased by utilizing heating oils with higher specific heat capacity values.

In some embodiments, the channels 450 may be electric heating rods configured to heat the platen 430. The heating power of the platen 430 may be adjusted by adjusting a current, voltage, resistivity, volume, and, in some embodiments, the distribution of the electric heating rods. In some embodiments, the electric heating rods may be a single electric heating rod which winds through the platen 430. In other embodiments, the electric heating rods may be multiple electric heating rods which pass through the platen.

In some embodiments, the platen 430 is a cooling platen. Chiller fluid (cold heat transfer fluid) may flow through the channels 450. The platen 430 may draw heat from the mat 410 through the belt 420 and rollers 425. The chiller fluid may flow through the channels 450 and draw heat from the platen 430. The chiller fluid may be cooled in a cooling system, such as a chiller, before flowing through the channels 450. The chiller fluid may circulate through the cooling system and the channels 450 in a circuit. In some embodiments, the channels 450 are a single channel which forms a circuit within the platen 430. In other embodiments, the channels 450 are distinct channels which each independently circulate through the platen 430 and the cooling system. The channels 450 may be evenly distributed in the platen 430.

A cooling power of the platen 430 may be increased by increasing a flow rate of the chiller fluid in the channels 450. In some cases, the distance between channels might be too large or the distance between channels and the surface of the platen that contacts the steel belt can be too large for the surface temperature of the belt to be approximately the same as the temperature of the exiting chiller fluid. Under these conditions, the rate of cooling can be governed by the thermal conduction rate of the steel. When this occurs, the cooling power of the platen 430 may be increased by increasing the internal volume of the channels 450. The flow rate of chiller fluid and the internal volume of the channels may be tuned to provide a desired cooling power of the platen 430. A temperature of the chiller fluid is measured prior to circulation in the platen 430 and after circulation in the platen to determine an amount of heat transferred from the platen 430 to the chiller fluid. The flow rate of chiller fluid in the channels 450 may be adjusted based on the measured temperatures to adjust the cooling power of the platen 430. Typically, the temperature of the chiller fluid as it enters the platen will be adjusted in a manner that achieves the targeted platen temperature at the surface of the platen that contacts the steel belt. For example, the temperature of the chiller fluid might be set to about 40° F. as it enters the platen in order to achieve a platen surface temperature of about 70° F. in a portion of the cold press. The cooling power of the platen can also be increased by utilizing chiller fluids with higher specific heat capacity values.

Figure 5:
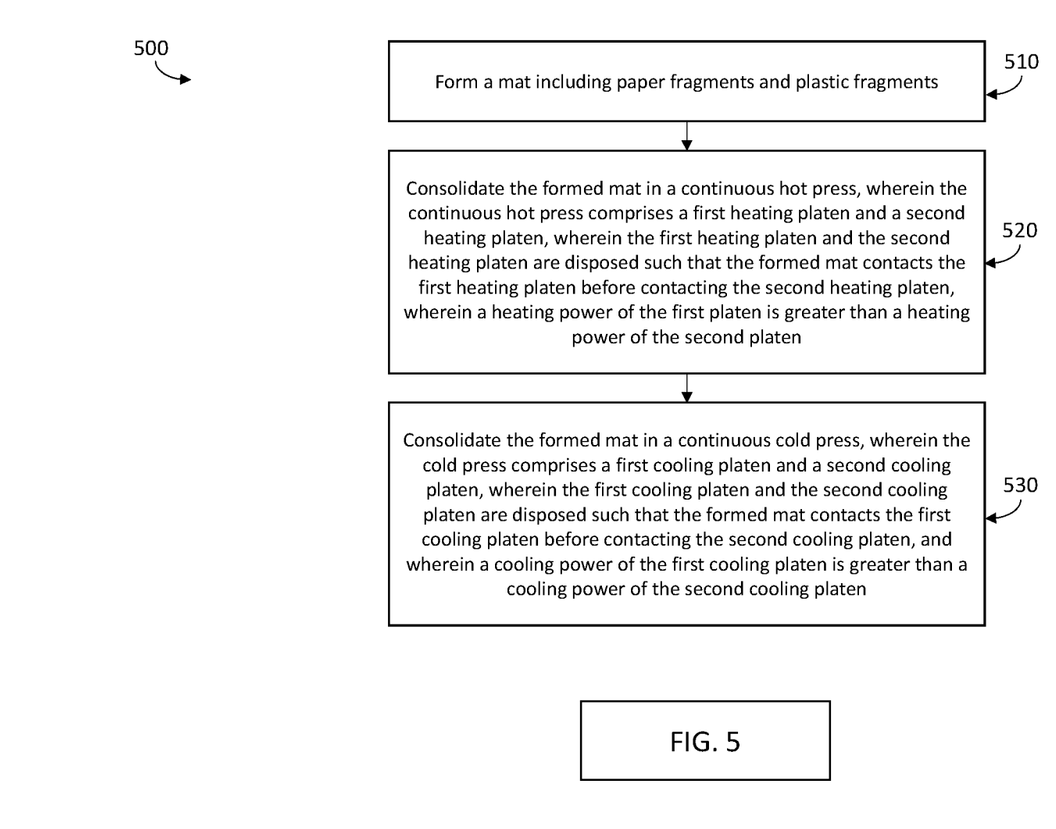
FIG. 5 illustrates an example flowchart, in accordance with one or more embodiments.

FIG. 5 is an example flowchart 500 illustrating operations for manufacturing a mat including paper fragments and plastic fragments, in accordance with one or more embodiments. Additional, fewer, or different operations may be performed in the method, depending on the embodiment. Further, the operations may be performed in the order shown, concurrently, or in a different order. The operations may be performed by the press system 200 of FIG. 2 or by the press system of FIG. 3.

At 510, a mat is formed including paper fragments and plastic fragments. The mat may be the mat 100 of FIG. 1. The mat may be formed by dispensing paper fragments and plastic fragments onto a belt. wherein the mat contains one or two outer surface layers having a maximum processing temperature. The belt may carry the mat to be consolidated by a hot press and a cold press.

At 520, the formed mat is consolidated in a continuous hot press. The hot press may include a first pair of opposing top and bottom heating platens and a second pair of opposing top and bottom heating platens, wherein the temperature of all platens of the continuous hot press have the value which is equal to or less than the maximum processing temperature of the outer surface layer. The first heating platen pair may be disposed in front of the second heating platen pair, such that as the mat is carried to the hot press by the belt, the formed mat is processed between the first pair of heating platens before it is processed between the second pair of heating platens. A heating power of the first heating platen pair may be greater than a heating power of the second heating platen pair. In some embodiments, the hot press may be a heating zone of a continuous press having the heating zone and a cooling zone, wherein the mat contains one or two outer surface layers, wherein the temperature of all platens of the continuous hot press have the value which is equal to or less than the maximum processing temperature of the outer surface layer At 530, the formed mat is consolidated in a continuous cold press. The cold press may include a first pair of opposing top and bottom cooling platens and a second pair of opposing top and bottom cooling platens. The first cooling platen pair may be disposed in front of the second cooling platen pair, such that as the mat is carried to the cold press by the belt, the formed mat is processed between the first cooling platen pair before being processed between the second cooling platen pair. A cooling power of the first cooling platen pair may be greater than a cooling power of the second cooling platen pair. In some embodiments, the cold press may be a cooling zone of a continuous press having a heating zone and the cooling zone.

After the mat is consolidated, the consolidated mat may be cut and trimmed to obtain a final product. Additional layers may be added to the final product.

In some embodiments, pressure is removed from the mat between consolidation by the hot press and consolidation by the cold press. This removal of pressure may allow superheated water in the mat to be converted to steam, drawing heat from the mat. Pressure may be removed from the mat gradually to prevent explosion of and/or structural damage to the mat.

A mat is formed containing paper fragments and plastic fragments. A core fragment layer of the mat has paper fragments and plastic fragments of a first size in a first ratio of paper fragments to plastic fragments. A top fragment layer and a bottom fragment layer of the mat have paper fragments and plastic fragments of a second size in a second ratio of paper fragments to plastic fragments. The mat includes a top outer surface layer and a bottom outer surface layer. The mat is formed in a continuous ribbon by dispensing paper fragments and plastic fragments of the appropriate size and ratio in order onto the bottom outer surface layer on a conveyor belt. The top outer surface layer is placed on top of the fragment top layer of the mat once the bottom fragment layer, the core fragment layer, and the top fragment layer are formed.

The formed mat is carried by the belt to a continuous press. The continuous press includes a top belt and a bottom belt which directly contact the mat as the platens exert pressure to the formed mat through the top and bottom belts. The continuous press includes a heating zone and a cooling zone. The heating zone includes 10 hot platens above the mat and 10 hot platens below the mat opposite the 10 hot platens above the mat. The cooling zone includes 10 cold platens above the mat and 10 cold platens below the mat opposite the 10 cold platens above the mat. The hot platens have a temperature of 320° F. at the interface between the platen and the steel belt and the cold platens have a temperature of 70° F. at the interface between the platen and the steel belt. The top and bottom outer surface layers can withstand a temperature of 330° F. without being damaged. Each hot platen includes heating channels through which heating oil flows, transferring heat to the hot platen. Each cold platen includes cooling channels through which chiller fluid flows, drawing heat from the cold platen. Each hot platen pair has a heating power and each cold platen pair has a cooling power.

In some embodiments the heating power for a pair of opposing top and bottom platens can be calculated using the approach shown in Equation 1.

$$\text{Heating Power (W/ft}^2) = \frac{2Q\rho\Delta Tc\left(1000\ \frac{\text{g}}{\text{kg}}\right)}{(60\ \text{s/min})A}. \quad \text{Equation 1}$$

Where,
Q=Heat Transfer Fluid Flow Rate (L/min)
ρ=Heat Transfer Fluid Density (kg/L)
ΔT=Heat Transfer Fluid Temperature Drop (K) as it circulates within the platen (inlet vs outlet temperature)
c=Heat Transfer Fluid Heat Capacity (J/g/K)
A=Mat Contact Area (ft²) for the Platen that is being Heated with Hot Transfer Fluid Note that the '2' in the numerator of equation 1 reflects the use of both top and bottom platens.

Likewise, in some embodiments the cooling power for a pair of opposing top and bottom platens can be calculated using the approach shown in Equation 2.

$$\text{Cooling Power (W/ft}^2) = \frac{2Q\rho\Delta Tc\left(1000\ \frac{\text{g}}{\text{kg}}\right)}{(60\ \text{s/min})A}. \quad \text{Equation 2}$$

Where,
Q=Chiller Fluid Flow Rate (L/min)
ρ=Chiller Fluid Density (kg/L)
ΔT=Chiller Fluid Temperature Increase (K) as it circulates within the platen (inlet vs outlet temperature)
c=Chiller Fluid Heat Capacity (J/g/K)
A=Mat Contact Area (ft²) for the Platen that is being Cooled with Chiller Fluid Note that the '2' in the numerator of equation 2 reflects the use of both top and bottom platens.

For illustration, consider a continuous press that is 8' wide and 192' long. The length is partitioned into segments (each 8' long, 24 count). Each segment has top and bottom platens with a network of interconnected internal channels. Hot oil is pumped through the channels within the twentieth pair of opposing top and bottom platens at a flow rate of 50 L/min. The temperature of the hot oil is 500 K prior to entering each platen and exits the platen with a temperature of 477 K. The density of the heat transfer fluid is 0.87 kg/L and the heat capacity is 2.3 J/g/K at its operating temperature. A heated platen of this sort should have a platen surface temperature of about 400° F. The linear speed of the production line is 40 ft/minute. The heating power of the twentieth pair of opposing top and bottom heating platens can be estimated using equation 1 to be 1,198.5 W/ft². This heating power can also be expressed as about 30.0 W/ft² per ft/min of line speed.

In another example, a continuous cold press is 8' wide and 64' long. The length is partitioned into segments (each 8' long, 8 count). Each segment has pairs of opposing top and bottom platens with a network of interconnected internal channels. Cooling fluid is pumped through the channels within each top and bottom platen of the second segment at a flow rate of 100 L/min. The temperature of the cooling fluid is 277 K prior to entering the platen and exits the platen with a temperature of 294 K. The density of the cooling fluid is 1.00 kg/L and the heat capacity is 4.2 J/g/K at its operating temperature. A cold platen of this sort might have a platen surface temperature of about 70° F. The linear speed of the production line is 50 ft/minute. The cooling power of the second pair of opposing top and bottom heating platens can be estimated using equation 2 to be 3,718.8 W/ft². This heating power can also be expressed as about 74.4 W/ft² per ft/min of line speed.

The heating zone is located before the cooling zone, such that the formed mat passes through the heating zone before passing through the cooling zone. A first pair of opposing hot platens have a combined heating power of about 150-300 W/ft² per each ft/min of line speed plus the product of 2.1 W/ft² per each ft/min of line speed and the temperature difference in Fahrenheit between the hot platen surface temperature and the incoming belt temperature for a press segment length of about 2.5 meters. A second pair of opposing hot platens have a combined heating power of about 70-125 W/ft² per each ft/min of line speed. A third pair of opposing hot platens have a combined heating power of about 50-90 W/ft² per each ft/min of line speed. A fourth pair of opposing hot platens have a combined heating power of about 40-80 W/ft² per each ft/min of line speed. A fifth pair of opposing hot platens have a combined heating power of about 35-65 W/ft² per each ft/min of line speed. A sixth pair of opposing hot platens have a combined heating power of about 30-60 W/ft² per each ft/min of line speed. A seventh pair of opposing hot platens have a combined heating power of about 30-55 W/ft² per each ft/min of line speed. An eighth pair of opposing hot platens have a combined heating power of about 25-50 W/ft² per each ft/min of line speed. A ninth pair of opposing hot platens have a combined heating power of about 20-45 W/ft² per each ft/min of line speed. A tenth pair of opposing hot platens have a combined heating power of about 15-40 W/ft² per each ft/min of line speed.

A first pair of opposing cold platens have a combined cooling power of about 125-200 W/ft² per each ft/min of line speed plus the product of 2.1 W/ft² per each ft/min of line speed and the temperature difference in Fahrenheit between the cold platen surface temperature and the incoming belt temperature for a press segment length of about 2.5 meters. A second pair of opposing cold platens have a combined cooling power of about 40-100 W/ft² per each ft/min of line speed. A third pair of opposing cold platens have a combined cooling power of about 35-70 W/ft² per each ft/min of line speed. A fourth pair of opposing cold platens have a combined cooling power of about 25-55 W/ft² per each ft/min of line speed. A fifth pair of opposing cold platens have a combined cooling power of about 25-50 W/ft² per each ft/min of line speed. A sixth pair of opposing cold platens have a combined cooling power of about 20-45 W/ft² per each ft/min of line speed. A seventh pair of opposing cold platens have a combined cooling power of about 15-40 W/ft² per each ft/min of line speed. An eighth pair of opposing cold platens have a combined cooling power of about 15-35 W/ft² per each ft/min of line speed. A ninth pair of opposing cold platens have a combined cooling power of about 10-30 W/ft² per each ft/min of line speed. A tenth pair of opposing cold platens have a combined cooling power of about 10-25 W/ft² per each ft/min of line speed.

The consolidated mat is carried by the belt out of the cooling zone of the continuous press to be cut and trimmed into a final product.

In another example, the continuous press is used to consolidate a mat including wood.

In yet another example, the continuous press includes a heating zone but not a cooling zone. The continuous press is used to consolidate a mat including wood.

In yet another example, a single-opening press is used including a hot press and a cold press. The hot platens of the hot press have a surface temperature of about 300-420° F. Top and bottom hot platens of the hot press have a combined heating power of about 12,000-16,000 W/ft². The cold platens of the cold press have a surface temperature of about 35-110° F. Top and bottom platens of the cold press have a combined cooling power of about 9,000-11,000 W/ft².

INDUSTRIAL APPLICABILITY

A method for making thermally-fused composites including a core layer of paper fragments and plastic fragments, top and bottom outer surface layers including nonwovens, fabrics and/or films with either no known melt point or a melt point greater than about 350° F., and adhesive layers between the core layer and the top and bottom outer surface layers; said method including first forming a mat including a bottom outer surface layer, a bottom adhesive layer, a core layer consisting of paper fragments and plastic fragments, a top adhesive layer, and a top outer surface layer. Second, consolidating said formed mat in a continuous hot-press, wherein the hot-press has multiple heating segments along the length of the hot-press, the platen surfaces that directly contact the steel belts are maintained within a temperature range of about 300-420° F., wherein the heating power of the platens is about 150-300 W/ft² per each ft/min of line speed plus the product of 2.1 W/ft² per each ft/min of line speed and the temperature difference in Fahrenheit between the hot platen surface temperature and the incoming belt temperature for the first 10% portion of the length of the hot-press for a press segment length of about 2.5 meters; the heating power is about 75-125 W/ft² per each ft/min of line speed for the second 10% portion of the length of the hot-press; the heating power is about 40-90 W/ft² per each ft/min of line speed for the third and fourth 10% portions of the length of the hot-press; the heating power is about 30-70 W/ft² per each ft/min of line speed for the fifth, sixth, and seventh 10% portions of the length of the hot-press; the heating power is about 20-50 W/ft² per each ft/min of line speed for the eighth, ninth, and tenth 10% portions of the length of the hot-press; wherein the stated power values represent the sum of power from both the top and bottom platens for each segment. Third, consolidating said formed mat in a continuous cold-press, wherein the cold-press has multiple segments along the length of the cold-press, the platen surfaces that directly contact the steel belts are maintained within a temperature range of about 35-110° F., wherein the cooling power of the platens is about 125-200 W/ft² per each ft/min of line speed plus the product of 2.1 W/ft² per each ft/min of line speed and the temperature difference in Fahrenheit between the cold platen surface temperature and the incoming belt temperature for the first 10% portion of the length of the cold-press for a press segment length of about 2.5 meters; the cooling power is about 40-100 W/ft² per each ft/min of line speed for the second 10% portion of the length of the cold-press; the cooling power is about 25-70 W/ft² per each ft/min of line speed for the third and fourth 10% portions of the length of the cold-press; the cooling power is about 15-50 W/ft² per each ft/min of line speed for the fifth, sixth, and seventh 10% portions of the length of the cold-press; the cooling power is about 10-40 W/ft² per each ft/min of line speed for the eighth, ninth, and tenth 10% portions of the length of the cold-press; wherein the stated power values represent the sum of power from both the top and bottom platens of each segment.

A method for making thermally-fused composites including a core layer of paper fragments and plastic fragments, top and bottom outer surface layers including nonwovens, fabrics and/or films with either no known melt point or a melt point greater than about 350° F., and adhesive layers between the core layer and the top and bottom outer surface layers. Said method including first forming a mat including a bottom outer surface layer, a bottom adhesive layer, a core layer including paper fragments and plastic fragments, a top adhesive layer, and a top outer surface layer; second, consolidating said formed mat in a continuous hot-press, wherein the hot-press has multiple heating segments along the length of the hot-press, the platen surfaces that directly contact the steel belts are maintained within a temperature range of about 300-420° F., wherein the heating power of the platens is about 150-300 W/ft$^2$ per each ft/min of line speed plus the product of about 2.1 W/ft$^2$ per each ft/min of line speed and the temperature difference in Fahrenheit between the hot platen surface temperature and the incoming belt temperature for the first 10% portion of the length of the hot-press for a press segment length of about 2.5 meters; wherein the stated power values represent the sum of power from both the top and bottom platens for each segment; third, consolidating said formed mat in a continuous cold-press, wherein the cold-press has multiple segments along the length of the cold-press, the platen surfaces that directly contact the steel belts are maintained within a temperature range of about 35-110° F., wherein the cooling power of the platens is about 125-200 W/ft$^2$ per each ft/min of line speed plus the product of 2.1 W/ft$^2$ per each ft/min of line speed and the temperature difference in Fahrenheit between the cold platen surface temperature and the incoming belt temperature for the first 10% portion of the length of the cold-press for a press segment length of about 2.5 meters; wherein the stated power values represent the sum of power from both the top and bottom platens of each segment.

A method for making thermally-fused composites including a core layer of paper fragments and plastic fragments, top and bottom outer surface layers including nonwovens, fabrics and/or films with either no known melt point or a melt point greater than about 350° F., and adhesive layers between the core layer and the top and bottom outer surface layers, said method including first forming a mat including a bottom outer surface layer, a bottom adhesive layer, a core layer including paper fragments and plastic fragments, a top adhesive layer, and a top outer surface layer. Second, consolidating said formed mat in a continuous hot-press, wherein the hot-press has multiple heating segments along the length of the hot-press, the platen surfaces that directly contact the steel belts are maintained within a temperature range of about 300-420° F., wherein the heating power of the platens is greater than about 125 W/ft$^2$ per each ft/min of line speed plus the product of 2.1 W/ft$^2$ per each ft/min of line speed and the temperature difference in Fahrenheit between the hot platen surface temperature and the incoming belt temperature for the first 10% portion of the length of the hot-press for a press segment length of about 2.5 meters; wherein the stated power values represent the sum of power from both the top and bottom platens for each segment. Third, consolidating said formed mat in a continuous cold-press, wherein the cold-press has multiple segments along the length of the cold-press, the platen surfaces that directly contact the steel belts are maintained within a temperature range of about 35-110° F., wherein the cooling power of the platens is greater than about 100 W/ft$^2$ per each ft/min of line speed plus the product of 2.1 W/ft$^2$ per each ft/min of line speed and the temperature difference in Fahrenheit between the cold platen surface temperature and the incoming belt temperature for the first 10% portion of the length of the cold-press for a press segment length of about 2.5 meters; wherein the stated power values represent the sum of power from both the top and bottom platens of each segment.

A method for making thermally-fused composites including a core layer of paper fragments and plastic fragments, top and bottom outer surface layers including nonwovens, fabrics and/or films with either no known melt point or a melt point greater than about 350° F., and adhesive layers between the core layer and the top and bottom outer facer layers, said method including first forming a mat including a bottom outer surface layer, a bottom adhesive layer, a core layer including paper fragments and plastic fragments, a top adhesive layer, and a top outer surface layer. Second, consolidating said formed mat in a single-opening hot-press, wherein the heating power of the platens of the hot-press is greater than about 12,000 W/ft$^2$. Third, consolidating said formed mat in a single-opening cold-press, wherein the cooling power of the platens of the cold-press is greater than about 9,000 W/ft$^2$.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
    forming a mat comprising paper fragments and plastic fragments;
    consolidating the formed mat in a continuous hot press, wherein the continuous hot press comprises a first pair of opposing top and bottom heating platens, a second pair of opposing top and bottom heating platens, and a third pair of opposing top and bottom heating platens, wherein the first heating platen pair, the second heating platen pair, and the third heating platen pair are disposed such that the formed mat is processed between the first heating platen pair and then the second heating platen pair and then the third heating platen pair, wherein a heating power of the first platen pair is greater than a heating power of the second platen pair and the heating power of the second platen pair is greater than a heating power of the third platen pair, and wherein the heating power of the first heating platen pair, the heating power of the second heating platen pair, and the heating power of the third platen pair are maintained constant with respect to time; and
    consolidating the formed mat in a continuous cold press, wherein the cold press comprises a first pair of opposing top and bottom cooling platens, a second pair of opposing top and bottom cooling platens, and a third pair of opposing top and bottom cooling platens, wherein the first cooling platen pair, the second cooling platen pair, and the third cooling platen pair are disposed such that the formed mat is processed between the first cooling platen pair, and then the second cooling platen pair, and then the third cooling platen pair, and wherein a cooling power of the first cooling platen pair is greater than a cooling power of the second cooling platen pair and the cooling power of the second cooling platen pair is greater than a cooling power of the third cooling platen pair.

2. The method of claim 1, further comprising forming the mat to include:
    a top outer surface layer attached to the mat by adhesive; and
    a bottom outer surface layer attached to the mat by adhesive.

3. The method of claim 1, wherein the heating power of the first heating platen pair, the heating power of the second heating platen pair, and the heating power of the third platen pair are held constant with respect to time using a high flow rate of heated oil through heating channels of the first heating platen pair and the second heating platen pair.

4. The method of claim 1, wherein the heating power of the first heating platen pair, the heating power of the second heating platen pair, and the heating power of the third platen pair are held constant using a high volume of heated oil flowing through heating channels of the first pair of heating platens, the second pair of heating platens, and the third pair of heating platens.

5. The method of claim 1, further comprising maintaining a temperature of the first heating platen pair equal to a temperature of the second heating platen pair and a temperature of the third heating platen pair, wherein the temperature is measured at the interface between the platens and the steel belt.

6. The method of claim 1, further comprising maintaining the cooling power of the first cooling platen pair, the cooling power of the second cooling platen pair, and the cooling power of the third cooling platen pair constant with respect to time.

7. The method of claim 1, wherein the cooling power of the first cooling platen pair, the cooling power of the second cooling platen pair, and the cooling power of the third cooling platen pair are held constant with respect to time using a high flow rate of chiller fluid through cooling channels of the first cooling platen pair and the second cooling platen pair.

8. The method of claim 1, wherein the cooling power of the first cooling platen pair, the cooling power of the second cooling platen pair, and the cooling power of the third cooling platen pair are held constant with respect to time using a high volume of chiller fluid flowing through cooling channels of the first cooling platen pair, the second cooling platen pair, and the third cooling platen pair.

9. The method of claim 1, further comprising maintaining a temperature of the first cooling platen pair equal to a temperature of the second cooling platen pair and a temperature of the third cooling platen pair, wherein the temperature is measured at the interface between the platens and the steel belt.

* * * * *